United States Patent
Sakai

(10) Patent No.: US 12,072,004 B1
(45) Date of Patent: Aug. 27, 2024

(54) LINEAR ACTUATOR

(71) Applicant: NSK LTD., Tokyo (JP)

(72) Inventor: Motoshi Sakai, Tokyo (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 18/292,008

(22) PCT Filed: Apr. 4, 2023

(86) PCT No.: PCT/JP2023/013952
§ 371 (c)(1),
(2) Date: Jan. 25, 2024

(87) PCT Pub. No.: WO2023/204016
PCT Pub. Date: Oct. 26, 2023

(30) Foreign Application Priority Data

Apr. 22, 2022 (JP) .................................. 2022-071135

(51) Int. Cl.
*F16H 25/22* (2006.01)
*F16H 25/20* (2006.01)

(52) U.S. Cl.
CPC ..... *F16H 25/2214* (2013.01); *F16H 25/2015* (2013.01)

(58) Field of Classification Search
CPC ............. F16H 25/2214; F16H 25/2015; F16H 25/2223; F16H 25/2228; F16H 25/2247; F16H 25/2204
See application file for complete search history.

(56) References Cited

U.S. PATENT DOCUMENTS 9,273,767 B2    3/2016  Kuster
11,209,060 B2 *  12/2021  Chelaidite ............. F16D 55/226
(Continued)

FOREIGN PATENT DOCUMENTS

CN       102472375 B  *  1/2015  ............. F16D 65/18
DE    102016216496 A1 *  3/2018  ......... F16H 25/2015
(Continued)

OTHER PUBLICATIONS

International Search Report for PCT/JP2023/013952 dated Jun. 20, 2023 (PCT/ISA/210).
(Continued)

*Primary Examiner* — Zakaria Elahmadi
(74) *Attorney, Agent, or Firm* — Sughrue Mion, PLLC

(57) ABSTRACT

A linear actuator of the present disclosure includes a ball screw device, a piston, and a rotation stopper. A screw shaft includes a screw shaft body, a male spline portion, and a step surface. A nut includes a first end surface, a first opening portion, and a first stopper. The piston includes a piston body, a cylindrical portion having a cylindrical shape, protruding in a second direction from a central portion of an opposite surface, and fitted into the male spline portion, and a second stopper protruding in the second direction from the opposite surface. The first stopper and the second stopper abut on each other and form the rotation stopper when the screw shaft is at an initial position. The step surface is arranged in the second direction compared to the first opening portion and is located inside the nut when the screw shaft is at the initial position.

7 Claims, 9 Drawing Sheets

(56) References Cited

U.S. PATENT DOCUMENTS

| | | | | |
|---|---|---|---|---|
| 2012/0079902 A1* | 4/2012 | Osterlanger | ............ | F16D 65/18 |
| | | | | 74/89.23 |
| 2014/0090501 A1* | 4/2014 | Kuster | ..................... | F16D 1/10 |
| | | | | 74/424.75 |
| 2024/0060551 A1* | 2/2024 | Brubaker | ................ | F16H 25/24 |

FOREIGN PATENT DOCUMENTS

| | | | | |
|---|---|---|---|---|
| EP | 4199320 A1 | 6/2023 | | |
| EP | 4239217 A1 * | 9/2023 | ......... | F16H 25/2015 |
| JP | 2019-056460 A | 4/2019 | | |
| JP | 2020143693 A * | 9/2020 | | |
| JP | 2021-042801 A | 3/2021 | | |
| JP | 2021032417 A * | 3/2021 | ......... | F16H 25/2204 |
| KR | 10-2021-0026057 A | 3/2021 | | |
| WO | WO-2011018304 A1 * | 2/2011 | ............. | F16D 65/18 |
| WO | WO-2021158788 A1 * | 8/2021 | ......... | F16H 25/2233 |
| WO | 2022/085704 A1 | 4/2022 | | |
| WO | WO-2022085704 A1 * | 4/2022 | ......... | F16H 25/2015 |
| WO | WO-2023026808 A1 * | 3/2023 | ......... | F16H 25/2015 |

OTHER PUBLICATIONS

Written Opinion for PCT/JP2023/013952 dated Jun. 20, 2023 (PCT/ISA/237).

* cited by examiner

LINEAR ACTUATOR

CROSS REFERENCE TO RELATED APPLICATIONS

This application is a National Stage of International Application No. PCT/JP2023/013952 filed Apr. 4, 2023, claiming priority based on Japanese Patent Application No. 2022-071135 filed Apr. 22, 2022.

FIELD

The present disclosure relates to a linear actuator.

BACKGROUND

A linear actuator includes a ball screw device that converts rotational motion into linear motion. In addition, in the linear actuator, a ball screw device may be used in a form of transmitting the rotational motion to a nut and moving a screw shaft in an axial direction. In a case where the screw shaft moves in the axial direction as described above, an object to be moved in the axial direction, such as a piston is attached to an end portion of the screw shaft. In addition, the linear actuator includes a rotation stopper in order to arrange the screw shaft at an initial position.

A rotation stopper of Patent Literature 1 in the following includes a first stopper provided on an end surface of a nut and a second stopper coupled to an end portion of a screw shaft. The second stopper includes a cylindrical portion having a cylindrical shape fitted into the end portion of the screw shaft and a protrusion protruding toward the outside in a radial direction from an outer peripheral surface of the cylindrical portion. The first stopper rotates together with the nut. When the second stopper enters a locus of the rotating first stopper, the first stopper and the second stopper come into contact with each other. As a result, the rotation of the nut stops and the screw shaft is arranged at an initial position. In Patent Literature 1 in the following, a swelling portion swelling in an axial direction is provided at a base of the protrusion of the second stopper. Note that the swelling portion of Patent Literature 1 in the following has an R shape. That is, the base of the protrusion of the second stopper increases in thickness in the axial direction toward the cylindrical portion. As a result, rigidity of the protrusion of the second stopper is increased, and the protrusion is not damaged even when a large load is input due to the contact with the first stopper.

CITATION LIST

Patent Literature

Patent Literature 1: Japanese Patent Application Laid-open No. 2021-42801

SUMMARY

Technical Problem

In the linear actuator of Patent Literature 1, the swelling portion is interposed between an edge of an opening portion of the nut and the cylindrical portion of the second stopper. That is, a gap amount between the edge of the opening portion and the cylindrical portion is large. Thus, grease inside the nut easily flows out to the outside of the nut.

In addition, grease may be accumulated on an inner peripheral side of the edge of the opening portion of the nut. Thus, in a case where the screw shaft is moved and an amount of protrusion of the screw shaft from the nut is reduced, there is a demand for returning a large amount of grease from the edge of the opening portion to the inside of the nut.

The present disclosure has been made in view of the above problems, and an object thereof is to provide a linear actuator capable of controlling an outflow of grease in a nut and returning a large amount of grease from an edge of an opening portion to the inside of the nut when a screw shaft is retracted.

Solution to Problem

To achieve the above object, a linear actuator according to an embodiment of the present disclosure comprising: a ball screw device including a nut, a screw shaft, and a plurality of balls; a piston attached to one end portion of the screw shaft; and a rotation stopper that sets an initial position of the screw shaft in a first direction indicated by the one end portion, wherein the screw shaft includes a screw shaft body provided with an outer peripheral raceway surface, a male spline portion that protrudes in the first direction from an end portion in the first direction of the screw shaft body and that has a smaller diameter than the screw shaft body, and a step surface that is provided at a boundary between the screw shaft body and the male spline portion and that faces the first direction, the nut includes an annular first end surface facing the first direction, a first opening portion which is located in an inner periphery of the first end surface and into which the screw shaft is inserted, and a first stopper protruding from the first end surface in the first direction, the piston includes a piston body having a pressing surface facing the first direction and an opposite surface facing a second direction opposite to the first direction, a cylindrical portion that has a cylindrical shape, protrudes from a central portion of the opposite surface in the second direction, and is fitted into the male spline portion, and a second stopper that protrudes from the opposite surface in the second direction and is continuous with an outer peripheral surface of the cylindrical portion, the first stopper and the second stopper abut on each other and form the rotation stopper in a case where the screw shaft is at the initial position, the step surface is arranged in the second direction compared to the first opening portion and is located inside the nut in a case where the screw shaft is at the initial position, the cylindrical portion protrudes in the second direction compared to the second stopper and abuts on the step surface, and an outer peripheral surface of the cylindrical portion has a larger diameter than a groove bottom of the outer peripheral raceway surface.

The second stopper of the present disclosure is continuous with the piston body and the cylindrical portion and has high rigidity. That is, it is not necessary to provide a swelling portion with respect to a base of the second stopper unlike a conventional technique. Thus, according to the present disclosure, since the swelling portion is not interposed between an edge of the first opening portion of the nut and the cylindrical portion, a gap amount between the edge of the first opening portion of the nut and the cylindrical portion can be reduced. As a result, grease inside the nut is less likely to flow out to the outside of the nut. Furthermore, according to the present disclosure, in a case where the screw shaft is at the initial position, the step surface is arranged in the second direction compared to the first opening portion. That is, the cylindrical portion abutting on the step surface passes through the first opening portion and enters an inner part of the nut when the screw shaft is retracted. Thus, the grease accumulated on an inner peripheral side of the edge of the first opening portion adheres to the cylindrical portion and returns to the inside of the nut. In addition, since the gap amount between the edge of the first opening portion and the cylindrical portion is small as described above, a large amount of grease adheres to the cylindrical portion and returns to the inside of the nut. Furthermore, according to the present disclosure, the cylindrical portion abuts on the step surface, and the grease hardly moves to the inner peripheral side of the cylindrical portion. That is, it is avoided that the grease enters between the male spline portion and the cylindrical portion and a friction coefficient decreases. Thus, the piston hardly comes off the screw shaft.

As a preferable embodiment of the linear actuator, the outer peripheral surface of the cylindrical portion has the diameter larger than an outer diameter of a screw thread of the screw shaft body.

According to the above configuration, a gap amount between the edge portion of the first opening portion and the cylindrical portion is reduced. Thus, it is difficult for the grease to flow out to the outside of the nut, and the grease that adheres to the cylindrical portion and returns to the inside of the nut also increases.

As a preferable embodiment of the linear actuator, the outer peripheral surface of the cylindrical portion has the diameter smaller than an outer diameter of a screw thread of the screw shaft body.

According to the above configuration, the cylindrical portion is prevented from coming into contact with the inner peripheral surface of the nut, and smooth rotation of the nut is secured.

As a preferable embodiment of the linear actuator, it further comprises a housing that houses the ball screw device, the piston, and the rotation stopper. The piston includes a cylindrical outer cylinder that protrudes from the opposite surface in the second direction and surrounds an outer peripheral side of the nut, and an outer peripheral surface of the outer cylinder forms a sliding surface slidably supported with respect to the housing.

According to the above configuration, the piston is hardly displaced in a direction orthogonal to the axial direction. Thus, movement of the piston in the axial direction becomes smooth.

As a preferable embodiment of the linear actuator according to claim 4, a gap amount between an inner peripheral surface of the outer cylinder and an outer peripheral surface of the nut is smaller than a gap amount between the cylindrical portion and the first opening portion.

According to the above configuration, the grease hardly passes through the inner peripheral surface of the outer cylinder and the outer peripheral surface of the nut. This makes it difficult for the grease to flow out of the piston.

As a preferable embodiment of the linear actuator, an inner peripheral surface of the outer cylinder is continuous with the second stopper.

According to the above configuration, the rigidity of the second stopper is improved.

As a preferable embodiment of the linear actuator, an edge of the first opening portion has a tapered shape a diameter of which increases toward the first direction, and the outer peripheral surface of the cylindrical portion is provided with a tapered slope which faces the edge of the first opening portion and a diameter of which increases toward the first direction.

A slope corresponding to the edge of the first opening portion is provided on the outer peripheral surface of the cylindrical portion. Thus, the gap amount between the edge of the first opening portion and the outer peripheral surface of the cylindrical portion is smaller than that in a case where no slope is included. Thus, the grease hardly flows outside the nut.

Advantageous Effects of Invention

According to the linear actuator of the present disclosure, an outflow of grease in the nut is controlled. In addition, when the screw shaft is retracted, a large amount of grease returns from the edge of the opening portion of the nut to the inside of the nut.

DESCRIPTION OF EMBODIMENTS

Hereinafter, the present disclosure will be described in detail with reference to the drawings. Note that the present disclosure is not limited by the following modes for carrying out the present disclosure (hereinafter, referred to as embodiments). In addition, components in the following embodiments include those that can be easily assumed by those skilled in the art, those that are substantially the same, and those within a so-called equivalent range. Furthermore, the components disclosed in the following embodiments can be appropriately combined.

First Embodiment

Figure 1:
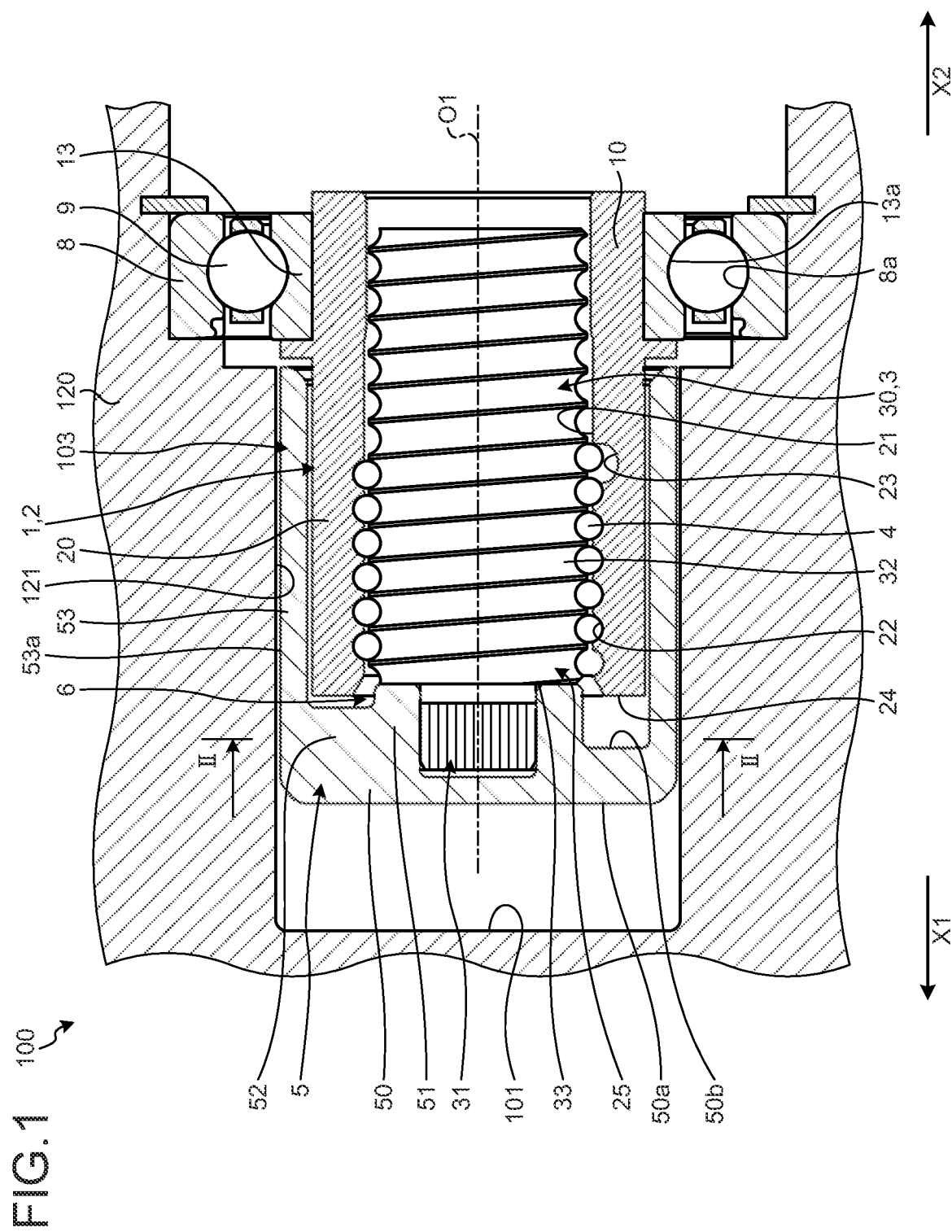
FIG. 1 is a cross-sectional view of a brake booster of an embodiment.
Figure 2:
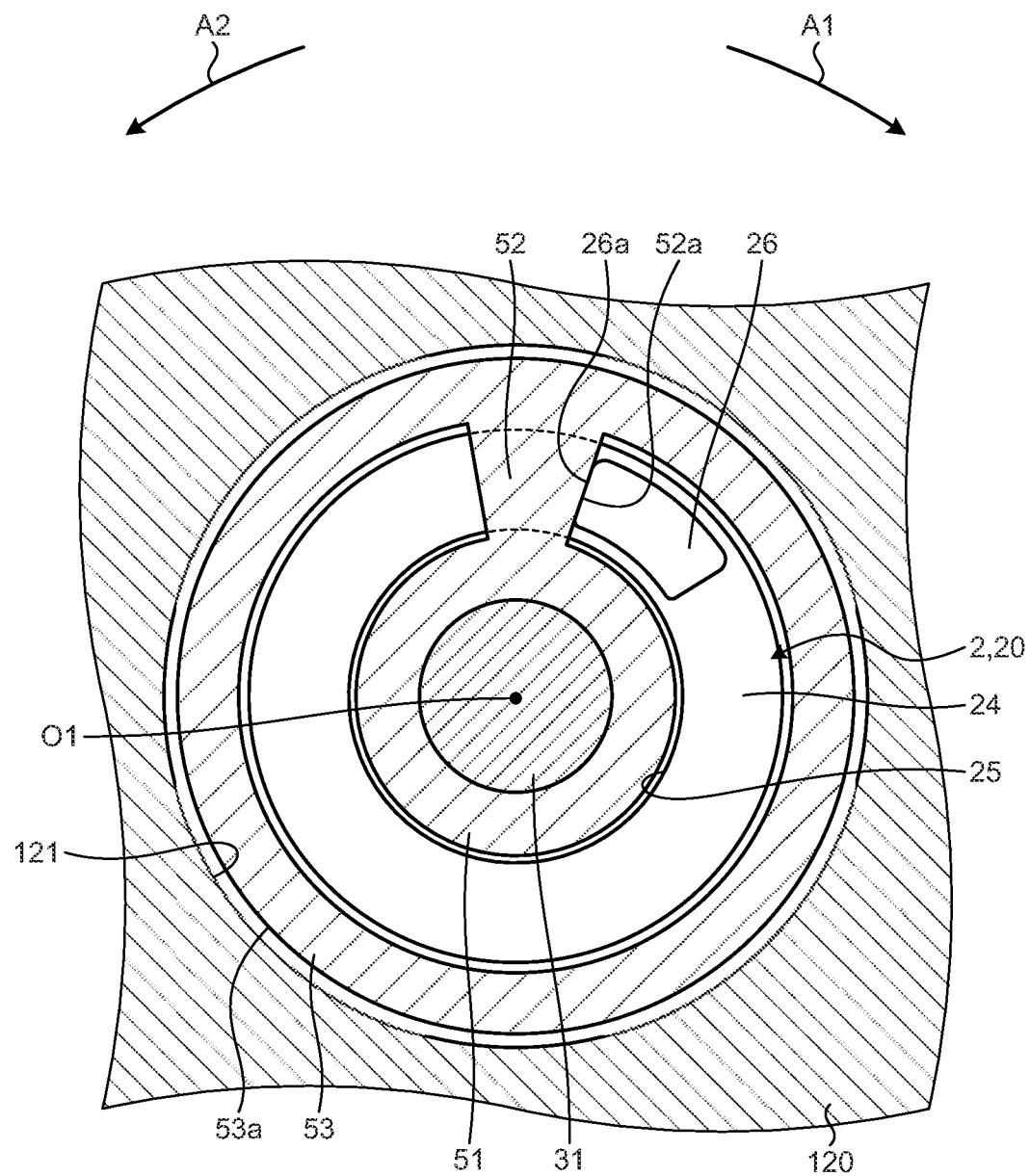
FIG. 2 is a cross-sectional view taken along a line II-II in FIG. 1 and viewed in a direction of arrows.
Figure 3:
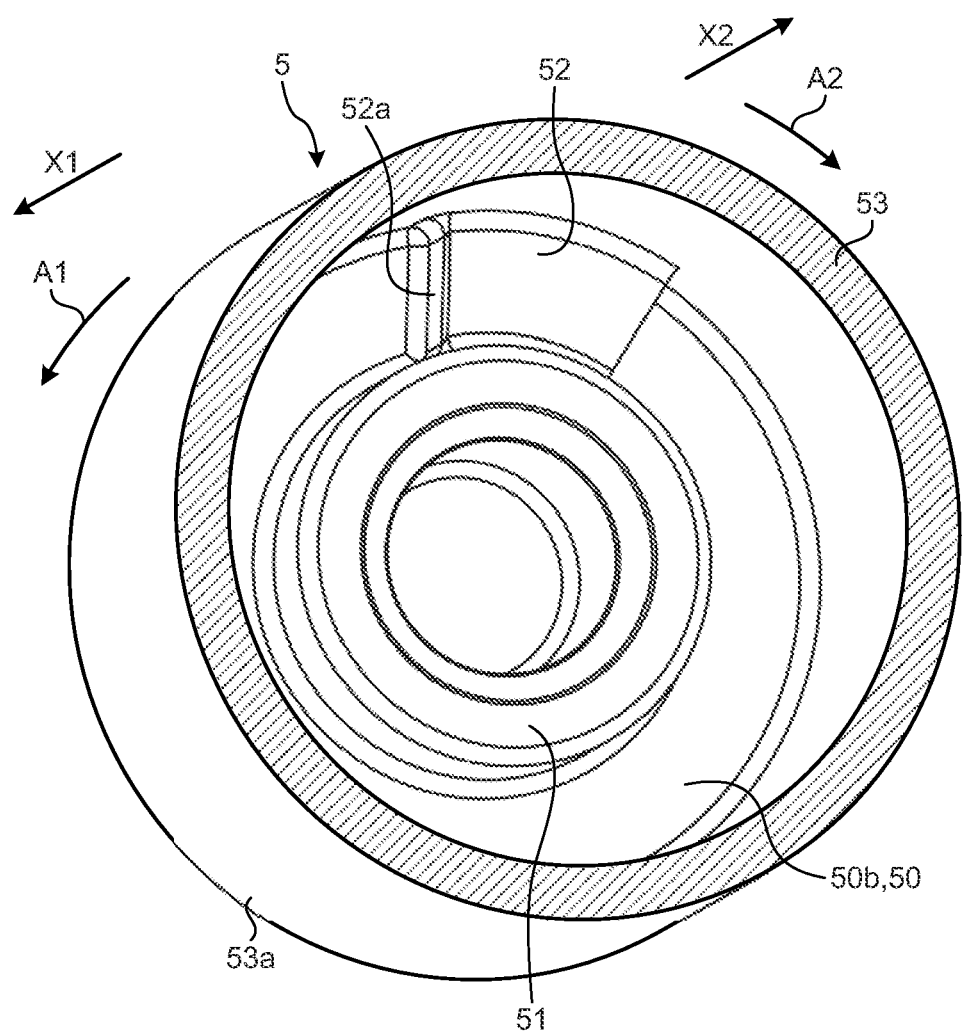
FIG. 3 is a perspective view of a piston of a first embodiment as viewed in a second direction.
Figure 4:
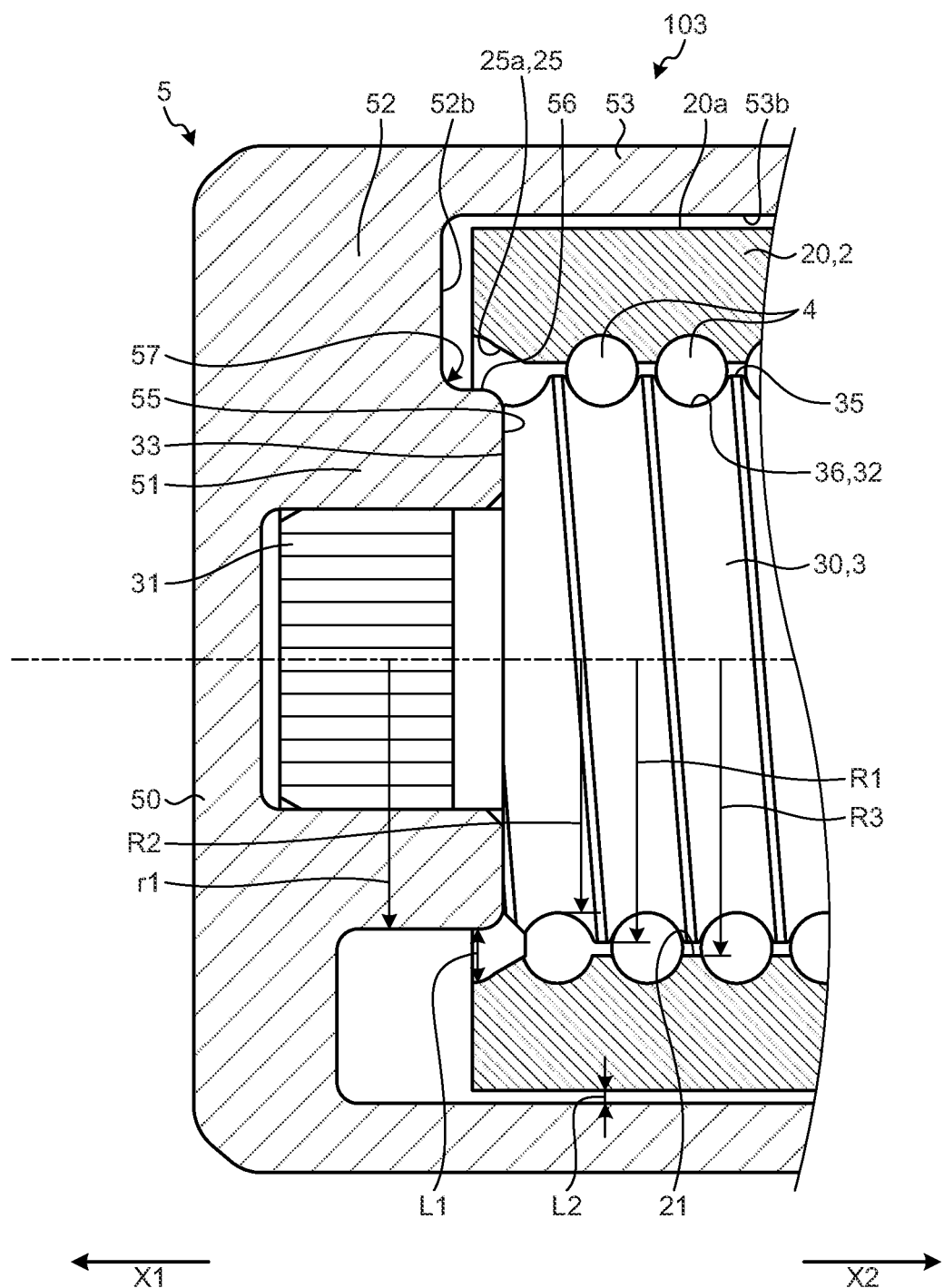
FIG. 4 is an enlarged view of a cylindrical portion and a vicinity thereof in FIG. 1.
Figure 5:
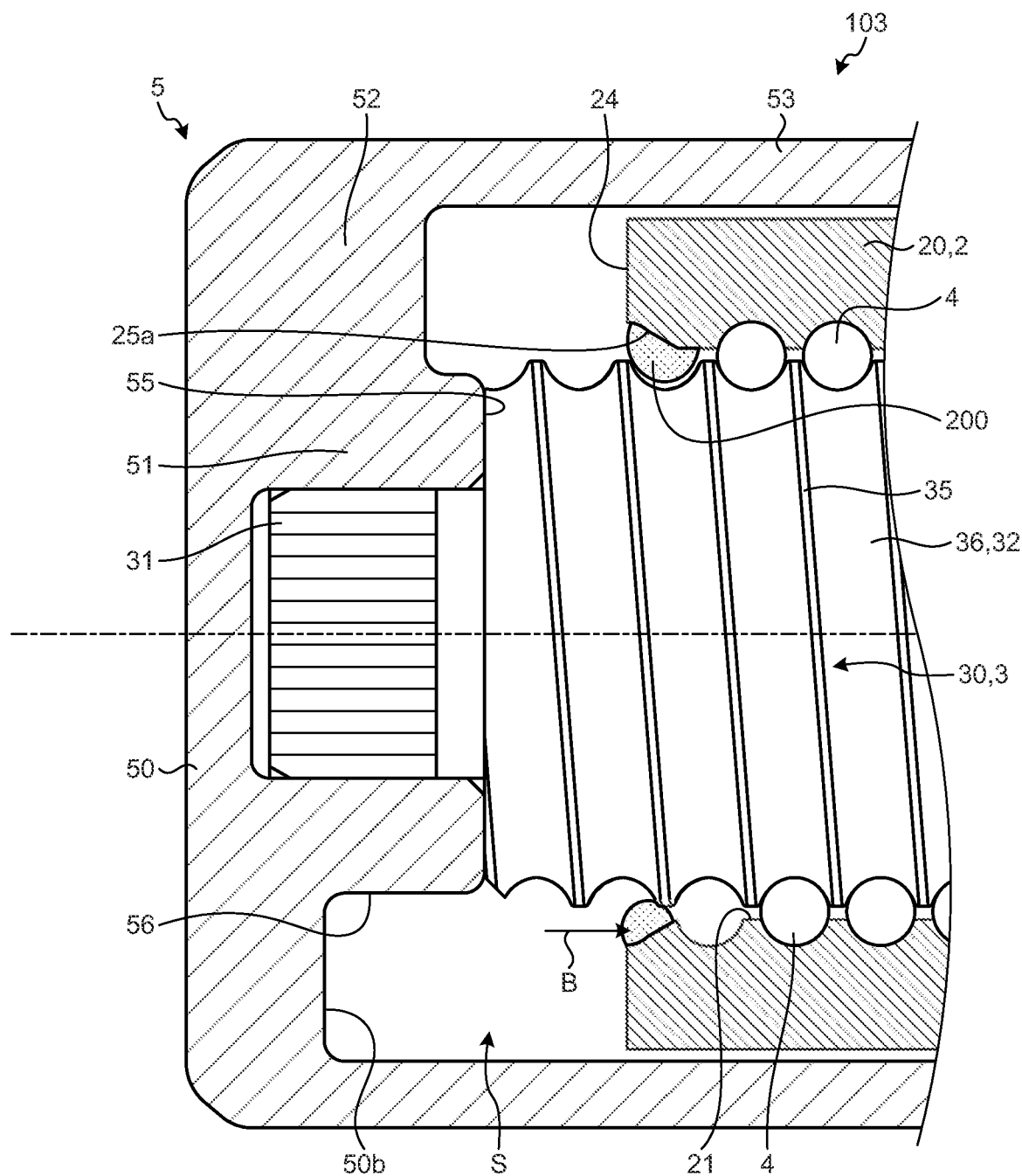
FIG. 5 is a view illustrating a state in which a screw shaft is moved in a first direction from an initial position.

FIG. 1 is a cross-sectional view of a brake booster according to an embodiment. FIG. 2 is a cross-sectional view taken along a line II-II in FIG. 1 and viewed in a direction of arrows. FIG. 3 is a perspective view of a piston of the first embodiment as viewed in a second direction. Note that in order to make an inner part of an outer cylinder 53 easy to see, a piston 5 in a state in which a portion in a second direction X2 is cut out from a central portion in an axial direction of the outer cylinder 53 is illustrated in FIG. 3. FIG. 4 is an enlarged view of a cylindrical portion and a vicinity thereof in FIG. 1. FIG. 5 is a view illustrating a state in which a screw shaft is moved in a first direction from an initial position.

In the first embodiment, an example in which the linear actuator of the present disclosure is applied to a brake booster will be described. However, the linear actuator of the present disclosure is not necessarily applied to the brake booster, and may be applied to other devices.

As illustrated in FIG. 1, a brake booster 100 is a device that is mounted on a vehicle and that generates hydraulic pressure corresponding to a pedaling amount of a brake pedal. The brake booster 100 includes a linear actuator 103, a motor (not illustrated) that generates rotational motion, a transmission device (not illustrated) that transmits the rotational motion of the motor to the linear actuator 103, and a housing 120.

The linear actuator 103 includes a ball screw device 1 that converts the rotational motion into linear motion, a piston 5, and a rotation stopper 6 that arranges a screw shaft 3 at an initial position. The ball screw device 1 includes a nut 2, the screw shaft 3, and balls 4. Hereinafter, a direction parallel to a shaft center O1 of the screw shaft 3 is referred to as an axial direction. Furthermore, in the axial direction, a direction in which the piston 5 is arranged as viewed from the screw shaft 3 is referred to as a first direction X1, and a direction opposite to the first direction X1 is referred to as a second direction X2.

The transmission device is a device that transmits the rotational motion of the motor to the nut 2, and examples thereof include a pulley structure, a planetary gear mechanism, and a reduction gear. However, a type of the transmission device is not specifically limited in the present disclosure.

The nut 2 is a cylindrical component centered on the shaft center O1. The nut 2 includes a coupling portion 10 located near an end of the nut 2 in the second direction X2, and a nut body 20 extended from the coupling portion 10 in the first direction X1.

The coupling portion 10 is supported by a bearing device. More specifically, an outer ring 8 of the bearing device is fitted into the housing 120. An inner ring 13 is fitted into an outer peripheral surface of the coupling portion 10. An inner peripheral groove surface 8a of the outer ring 8 and an outer peripheral groove surface 13a of the inner ring 13 face each other, and a ball 9 is arranged therebetween. Thus, the coupling portion 10 (nut 2) is rotatably supported by the housing 120. In addition, a transmission device (not illustrated) is arranged in the second direction X2 of the coupling portion 10. Then, the rotational motion is transmitted from the transmission device to the coupling portion 10.

An inner peripheral raceway surface 22 is provided on an inner peripheral surface 21 of the nut body 20. In addition, in the present embodiment, the inner peripheral raceway surface 22 is provided from a central portion in the axial direction to an end portion in the first direction X1 of the nut 2. Furthermore, the inner peripheral surface 21 of the nut body 20 is provided with a plurality of S grooves 23 that returns, for one lead, the ball moved by one lead (only one is illustrated in FIG. 1).

Note that the present disclosure is not limited to the S grooves 23 although the ball is circulated by the S grooves 23 in the present embodiment. For example, the balls 4 may be circulated by a roller. Alternatively, the nut 2 may be provided with a return hole in the axial direction, and the balls may be circulated by an end deflector or a middle deflector. A circulation method is not specifically limited.

As illustrated in FIG. 2, an annular first end surface 24 facing the first direction X1, and a first opening portion 25 which is located on an inner periphery of the first end surface 24 and into which the screw shaft 3 is inserted are provided at the end portion of the nut body 20 in the first direction X1. In addition, a first stopper 26 protruding in the first direction X1 is provided in the first end surface 24. Hereinafter, regarding a rotation direction, a clockwise (right-hand) direction viewed in the first direction X1 is referred to as a first rotation direction A1. A direction opposite to the first rotation direction A1 is referred to as a second rotation direction A2. The first stopper 26 has a first contact surface 26a facing the second rotation direction A2.

As illustrated in FIG. 1, the screw shaft 3 includes a screw shaft body 30 and a male spline portion 31 extending from the screw shaft body 30 in the first direction X1. An outer peripheral raceway surface 32 is provided on an outer peripheral surface of the screw shaft body 30. The plurality of balls 4 is arranged between the outer peripheral raceway surface 32 and the inner peripheral raceway surface 22. Then, when the nut 2 rotates in the first rotation direction A1 (see FIG. 2), the screw shaft 3 moves in the first direction X1. When the nut 2 rotates in the second rotation direction A2 (see FIG. 2), the screw shaft 3 moves in the second direction X2. Note that the movement of the screw shaft 3 in the second direction X2 corresponds to retraction.

A plurality of shaft splines extending in the axial direction is provided on the outer peripheral surface of the male spline portion 31. An outer diameter of the male spline portion 31 is smaller than an outer diameter of the screw shaft body 30. Thus, a step surface 33 facing the first direction X1 is provided at a boundary between the screw shaft body 30 and the male spline portion 31.

The piston 5 is arranged inside a cylinder 101 provided in the housing 120. Note that a brake fluid (not illustrated) is contained inside the cylinder 101. A through hole (not illustrated) is provided in the cylinder 101. The hydraulic pressure of the brake fluid is transmitted to a device outside the brake booster 100 via the through hole (not illustrated).

The piston 5 includes a piston body 50, a cylindrical portion 51, a second stopper 52, and an outer cylinder 53. The piston body 50 has a columnar shape (disc shape) around the shaft center O1. An end surface of the piston body 50 which surface faces the first direction X1 is a pressing surface 50a that presses the brake fluid in the cylinder 101. In addition, an end surface of the piston body 50 which surface faces the second direction X2 is an opposite surface 50b.

As illustrated in FIG. 3, the cylindrical portion 51 protrudes in the second direction X2 from a central portion of the opposite surface 50b. The cylindrical portion 51 has a cylindrical shape. Although not specifically illustrated, a plurality of hole splines extending in the axial direction is provided in an inner peripheral surface of the cylindrical portion 51. The male spline portion 31 of the screw shaft 3 is press-fitted into an inner peripheral side of the cylindrical portion 51, and the cylindrical portion 51 and the male spline portion 31 are spline-fitted. As a result, the cylindrical portion 51 is not likely to come off the male spline portion 31. Furthermore, the piston 5 is coupled to the screw shaft 3 in such a manner as to be relatively unrotatable.

The second stopper 52 protrudes from the opposite surface 50b in the second direction X2. In addition, the second stopper 52 is arranged on an outer peripheral side of the cylindrical portion 51. As illustrated in FIG. 2, the second stopper 52 faces the first end surface 24 of the nut 2 in the axial direction. The second stopper 52 has a second contact surface 52a facing the first rotation direction A1.

In a case where the screw shaft 3 is at the initial position, the first stopper 26 and the second stopper 52 are adjacent to each other in a circumferential direction. The first contact surface 26a and the second contact surface 52a abut on each other. In addition, an inner end in the radial direction of the second stopper 52 is continuous with an outer peripheral surface 51a of the cylindrical portion 51. Thus, rigidity of the second stopper 52 is improved. Furthermore, an outer end in the radial direction of the second stopper 52 is continuous with the inner peripheral surface of the outer cylinder 53. Thus, the rigidity of the second stopper 52 is further improved.

As illustrated in FIG. 3, the outer cylinder 53 is a cylindrical body protruding from the opposite surface 50b in the second direction X2. An inner diameter of the outer cylinder 53 is larger than an outer diameter of the nut body 20. As illustrated in FIG. 1, the outer cylinder 53 surrounds an outer peripheral side of the nut body 20. On the other hand, an outer peripheral surface 53a of the outer cylinder 53 faces a cylindrical inner peripheral surface 121 of the cylinder 101. A minute gap is provided between the outer peripheral surface 53a of the outer cylinder 53 and the inner peripheral surface 121 of the cylinder 101. Thus, the outer peripheral surface 53a of the outer cylinder 53 is supported slidably in the axial direction with respect to the inner peripheral surface 121 of the cylinder 101. In addition, a rotation stopper (not illustrated) is caught on the outer peripheral surface 53a of the outer cylinder 53. Thus, the piston 5 and the screw shaft 3 are supported by the housing 120 in such a manner as to be non-rotatable and movable in the axial direction.

Next, an operation of the linear actuator 103 will be described. When the nut 2 rotates in the first rotational direction A1 and the screw shaft 3 moves in the first direction X1, the hydraulic pressure of the brake fluid (not illustrated) in the cylinder 101 increases. Then, the hydraulic pressure of the brake fluid is transmitted to the external device through the through hole (not illustrated).

When the nut 2 rotates in the second rotation direction A2 in s state in which the piston 5 is moved in the first direction X1, the screw shaft 3 and the piston 5 move in the second direction X2. In addition, at a time point at which the screw shaft 3 returns to the initial position, the first stopper 26 and the second stopper 52 come into contact with each other. As a result, the rotation of the first stopper 26 and the nut 2 in the second rotation direction A2 is restricted. Thus, the screw shaft 3 is also restricted from moving in the second direction X2. That is, the screw shaft 3 is positioned at the initial position. From the above, in a case where the linear actuator 103 is operated next time, the operation is performed from a state in which the screw shaft 3 is returned to the initial position. From the above, the first stopper 26 and the second stopper 52 form the rotation stopper 6. That is, the rotation stopper 6 includes the first stopper 26 and the second stopper 52.

Next, details of configurations of the cylindrical portion 51 and the vicinity thereof will be described. As illustrated in FIG. 4, the cylindrical portion 51 has an end surface 55 facing the second direction X2, and an outer peripheral surface 56. The cylindrical portion 51 protrudes in the second direction X2 compared to the second stopper 52. In other words, the end surface 55 of the second stopper 52 is arranged in the second direction X2 compared to an end surface 52b of the second stopper 52 in the second direction X2.

The end surface 55 of the cylindrical portion 51 abuts on the step surface 33 of the screw shaft 3. As a result, grease 200 inside the nut 2 is prevented from passing between the end surface 55 and the step surface 33 and moving to the inner peripheral side of the cylindrical portion 51. Note that although the grease 200 is used in the present embodiment, the present disclosure is not limited to the grease 200, and lubricating oil may be used.

In addition, in a case of being arranged at the initial position of the screw shaft 3, the step surface 33 of the screw shaft 3 is located in the second direction X2 compared to the first opening portion 25 and is arranged inside the nut 2. Thus, the end surface 55 and the end portion of the cylindrical portion 51 in the second direction X2 are also arranged inside the nut 2. An edge 25a of the first opening portion 25 is arranged outside in the radial direction of the outer peripheral surface 56 of the cylindrical portion 51. The edge 25a is a tapered surface a diameter of which increases in the first direction X1. Hereinafter, a size of a gap between the outer peripheral surface 56 of the cylindrical portion 51 and the edge 25a of the first opening portion 25 is referred to as a gap amount L1.

A corner portion 57 formed by the end surface 52b of the second stopper 52 and the outer peripheral surface 56 of the cylindrical portion 51 is at a right angle. Note that a swelling portion swelling from the corner portion 57 in the second direction X2 is provided to improve the rigidity of the second stopper 52 in the conventional technique. In order to avoid contact between the swelling portion swelling from the corner portion 57 and the edge 25a of the first opening portion 25, the outer peripheral surface 56 of the cylindrical portion 51 is separated from the edge 25a. On the other hand, in the present embodiment, since the swelling portion is not provided at the corner portion 57, a distance between the outer peripheral surface 56 of the cylindrical portion 51 and the edge 25a is small (the gap amount L1 is small). That is, the grease 200 (see FIG. 5) hardly flows out from the inside of the nut 2 to the outside.

In addition, an outer diameter of the outer peripheral surface (screw thread 35) of the screw shaft 3 is R1 in the present embodiment. An outer diameter of a groove bottom 36 of the outer peripheral raceway surface 32 is R2. Note that the groove bottom 36 of the outer peripheral raceway surface 32 is a portion having the longest distance from the screw thread 35, that is, a portion having the smallest diameter from the shaft center O1 in the outer peripheral raceway surface 32. An inner diameter of the nut body 20 (diameter of the inner peripheral surface 21) is R3.

A diameter r1 of the outer peripheral surface 56 is smaller than the inner diameter R3 of the nut body 20 (r1<R3) in order to avoid contact with the nut body 20. In addition, the diameter r1 of the outer peripheral surface 56 is smaller than the outer diameter R1 of the screw thread 35 (r1<R1). Thus, the outer peripheral surface 56 hardly comes into contact with the nut body 20. Furthermore, the diameter r1 of the outer peripheral surface 56 is larger than the outer diameter R2 of the groove bottom 36 of the outer peripheral raceway surface 32 (R2<r1).

In addition, as illustrated in FIG. 4, a gap amount L2 between an outer peripheral surface 20a of the nut body 20 and an inner peripheral surface 53b of the outer cylinder 53 is smaller than the gap amount L1. Thus, the grease 200 (see FIG. 5) hardly passes between the nut body 20 and the outer cylinder 53 and flows out of the piston 5.

Next, at the time of retraction of the screw shaft 3 will be described. As illustrated in FIG. 5, in the linear actuator 103, the grease 200 may be accumulated on the inner peripheral side of the edge 25a of the first opening portion 25 of the nut 2. Furthermore, in a case where the screw shaft 3 is arranged in the first direction X1 with respect to the initial position, the cylindrical portion 51 is arranged in the first direction X1 compared to the first opening portion 25. In such a case, in a case where the screw shaft 3 is retracted and returns to the initial position, the cylindrical portion 51 passes through the first opening portion 25 and moves into the nut 2. Thus, the grease 200 accumulated on the inner peripheral side of the edge 25a of the first opening portion 25 adheres to the end surface 55 and the outer peripheral surface 56 of the cylindrical portion 51 and moves in the second direction X2. That is, the grease 200 returns into the nut 2. In addition, since the gap amount L1 of the present embodiment is small, a large amount of the grease 200 adheres to the cylindrical portion 51. That is, the large amount of grease 200 returns into the nut 2.

Furthermore, as illustrated in FIG. 5, in a case where the screw shaft 3 moves in the first direction X1, a space S between the opposite surface 50b and the first end surface 24 expands. Then, when the screw shaft 3 moves in the second direction X2, the space S narrows down, and air pressure in the space S increases. Thus, gas tries to escape from the space S. Here, the gap amount L2 (see FIG. 4) between the nut body 20 and the outer cylinder 53 is small. Thus, the gas in the space S moves in such a manner as to flow to the inside of the nut 2 (see an arrow B in FIG. 5). As a result, the grease 200 that returns from the first opening portion 25 to the inside of the nut 2 increases.

As described above, the linear actuator 103 of the first embodiment includes the ball screw device 1 including the nut 2, the screw shaft 3, and the plurality of balls 4, the piston 5 attached to one end portion of the screw shaft 3, and the rotation stopper 6 that sets the initial position of the screw shaft 3 in the first direction X1 indicated by the one end portion. The screw shaft 3 includes the screw shaft body 30 provided with the outer peripheral raceway surface 32, the male spline portion 31 protruding in the first direction X1 from the end portion in the first direction X1 of the screw shaft body 30 and having a smaller diameter than the screw shaft body 30, and the step surface 33 provided at a boundary between the screw shaft body 30 and the male spline portion 31 and facing the first direction X1. The nut 2 includes the annular first end surface 24 facing the first direction X1, the first opening portion 25 which is located in the inner periphery of the first end surface 24 and into which the screw shaft 3 is inserted, and the first stopper 26 protruding from the first end surface 24 in the first direction X1. The piston 5 includes the piston body 50 having the pressing surface 50a facing the first direction X1 and the opposite surface 50b facing the second direction X2 opposite to the first direction X1, the cylindrical portion 51 that has a cylindrical shape, protrudes from a central portion of the opposite surface 50b in the second direction X2, and is fitted into the male spline portion 31, and the second stopper 52 that protrudes from the opposite surface 50b in the second direction X2 and is continuous with the outer peripheral surface 56 of the cylindrical portion 51. The first stopper 26 and the second stopper 52 abut on each other and form the rotation stopper 6 in a case where the screw shaft 3 is at the initial position. In a case where the screw shaft 3 is at the initial position, the step surface 33 is arranged in the second direction X2 compared to the first opening portion 25 and is located inside the nut 2. The cylindrical portion 51 protrudes in the second direction X2 compared to the second stopper 52 and abuts on the step surface 33. The outer peripheral surface 56 of the cylindrical portion 51 has a larger diameter than the groove bottom of the outer peripheral raceway surface.

According to the linear actuator 103 of the first embodiment, since the gap amount L1 is small, the grease 200 hardly flows out from the inside of the nut 2 to the outside. In addition, at the time of retraction of the screw shaft 3, the large amount of grease 200 adhering to the edge 25a of the first opening portion 25 adheres to the cylindrical portion 51 and returns to the inside of the nut 2. Furthermore, since the end surface 55 of the cylindrical portion 51 and the step surface 33 abut on each other, the grease 200 hardly moves to the inner peripheral side of the cylindrical portion 51. That is, it is avoided that the grease 200 enters between the male spline portion 31 and the cylindrical portion 51 and the friction coefficient decreases. Thus, the piston 5 hardly comes off the screw shaft 3.

In addition, the outer peripheral surface 56 of the cylindrical portion 51 of the first embodiment has a diameter smaller than the outer diameter R1 of the screw thread 35 of the screw shaft body 30.

According to the first embodiment, the outer peripheral surface 56 of the cylindrical portion 51 does not come into contact with the inner peripheral surface 21 of the nut 2. As a result, smooth rotation of the nut 2 is secured.

In addition, the linear actuator 103 of the first embodiment includes the housing 120 that houses the ball screw device 1, the piston 5, and the rotation stopper 6. The piston 5 has the cylindrical outer cylinder 53 that protrudes from the opposite surface 50b in the second direction X2 and that surrounds the outer peripheral side of the nut 2. The outer peripheral surface 53a of the outer cylinder 53 forms a sliding surface that is slidably supported with respect to the housing 120.

According to the first embodiment, the piston 5 is hardly displaced in the direction orthogonal to the axial direction. Thus, the movement of the piston 5 in the axial direction becomes smooth.

Furthermore, the gap amount L2 between the inner peripheral surface 53b of the outer cylinder 53 and the outer peripheral surface of the nut 2 is smaller than the gap amount L1 between the cylindrical portion 51 and the first opening portion 25 in the first embodiment.

According to the first embodiment, the grease 200 hardly flows out to the outside through the inner peripheral surface 53b of the outer cylinder 53 and the outer peripheral surface of the nut 2.

The inner peripheral surface of the outer cylinder 53 of the first embodiment is continuous with the second stopper 52.

According to the first embodiment, the rigidity of the second stopper 52 is further improved.

Although the first embodiment has been described above, the present disclosure is not limited to the example described in the first embodiment. For example, the piston 5 may not include the outer cylinder 53. Although the transmission device is included in the first embodiment, the transmission device may not be included in the present disclosure. That is, an output shaft of a motor may be directly coupled to the nut 2. In addition, in the present disclosure, the gap amount L2 between the inner peripheral surface 53b of the outer cylinder 53 and the outer peripheral surface of the nut 2 may be larger than or equal to the gap amount L1 between the cylindrical portion 51 and the first opening portion 25.

Although the diameter r1 of the outer peripheral surface 56 of the cylindrical portion 51 is smaller than the outer diameter R1 of the outer peripheral surface (screw thread 35) of the screw shaft body 30 in the first embodiment, the present disclosure is not limited thereto. Hereinafter, a first modification example and a second modification example in which the diameter r1 of the outer peripheral surface 56 of the cylindrical portion 51 is changed will be described. Furthermore, a third modification example in which corner portions 57 are not at the right angle will be described.

First Modification Example

Figure 6:
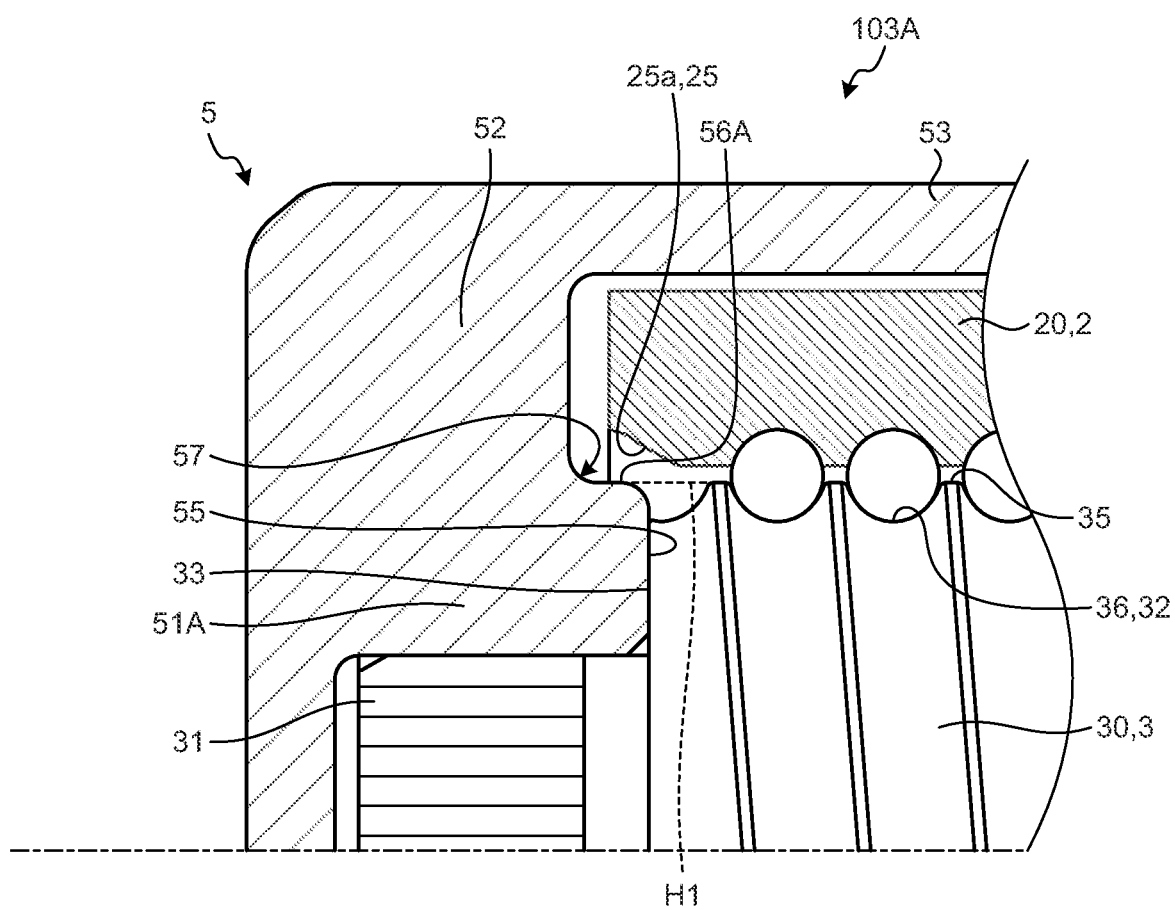
FIG. 6 is an enlarged view of a cylindrical portion and a vicinity thereof in a linear actuator according to a first modification example.

FIG. 6 is an enlarged view of a cylindrical portion and a vicinity thereof in a linear actuator according to the first modification example. As illustrated in FIG. 6, in a linear actuator 103A of the first modification example, a diameter of an outer peripheral surface 56A of a cylindrical portion 51A is the same as a diameter of an outer peripheral surface (screw thread 35) of a screw shaft body 30 (see an auxiliary line H1 in FIG. 6). A protrusion amount toward the outside in a radial direction of the cylindrical portion 51A of the first modification example is increased as compared with that of the cylindrical portion 51 of the first embodiment. That is, a gap amount L1 (see FIG. 4) between the outer peripheral surface 56A of the cylindrical portion 51A and an edge 25a of a first opening portion 25 is small. Thus, grease 200 (see FIG. 5) hardly flows out from the inside of a nut 2 to the outside. In addition, at the time of retraction of a screw shaft 3, an amount of the grease 200 that adheres to the cylindrical portion 51A and returns to the inside of the nut 2 increases. Furthermore, since the outer peripheral surface 56A of the cylindrical portion 51A does not protrude toward the outside as compared with the outer peripheral surface (screw thread 35) of the screw shaft body 30, the cylindrical portion 51A does not come into contact with an inner peripheral side of the nut 2. Thus, smooth rotation of the nut 2 is secured.

Second Modification Example

Figure 7:
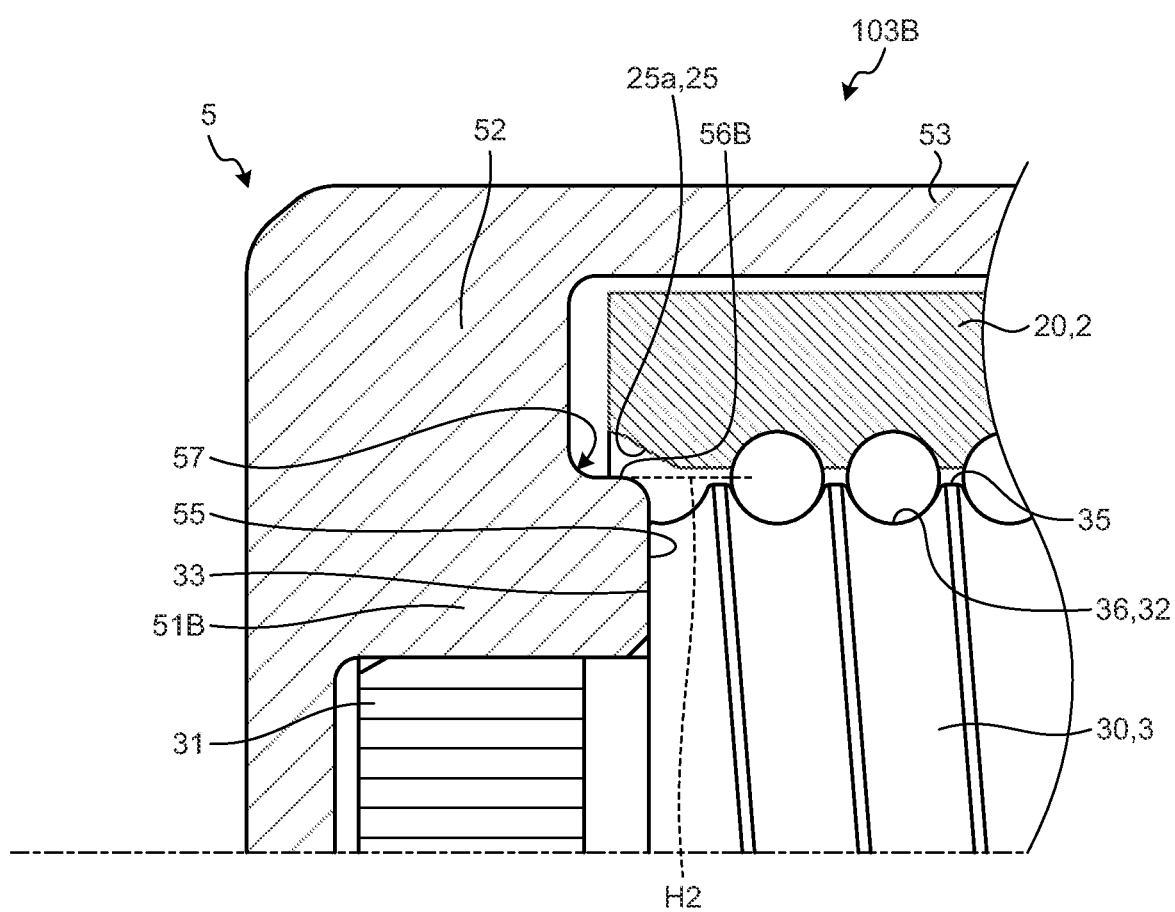
FIG. 7 is an enlarged view of a cylindrical portion and a vicinity thereof in a linear actuator according to a second modification example.

FIG. 7 is an enlarged view of a cylindrical portion and a vicinity thereof in a linear actuator according to the second modification example. As illustrated in FIG. 7, in a linear actuator 103B of the second modification example, a diameter of an outer peripheral surface 56B of a cylindrical portion 51B is larger than a diameter of an outer peripheral surface (screw thread 35) of a screw shaft body 30 (see auxiliary line H2 in FIG. 7). In other words, the cylindrical portion 51B of the second modification example protrudes toward the outside in a radial direction from the outer peripheral surface (screw thread 35) of the screw shaft body 30. According to the cylindrical portion 51B of the second modification example, a gap amount L1 (see FIG. 4) between the outer peripheral surface 56B of the cylindrical portion 51B and an edge 25a of a first opening portion 25 is further reduced as compared with that of the first modification example. Thus, grease 200 (see FIG. 5) is less likely to flow out from the inside of a nut 2 to the outside as compared with the first modification example. In addition, at the time of retraction of a screw shaft 3, an amount of the grease 200 that adheres to the cylindrical portion 51B and returns to the inside of the nut 2 further increases. However, according to the second modification example, there is a possibility that the cylindrical portion 51 comes into contact with an inner peripheral surface of the nut 2.

Third Modification Example

Figure 8:
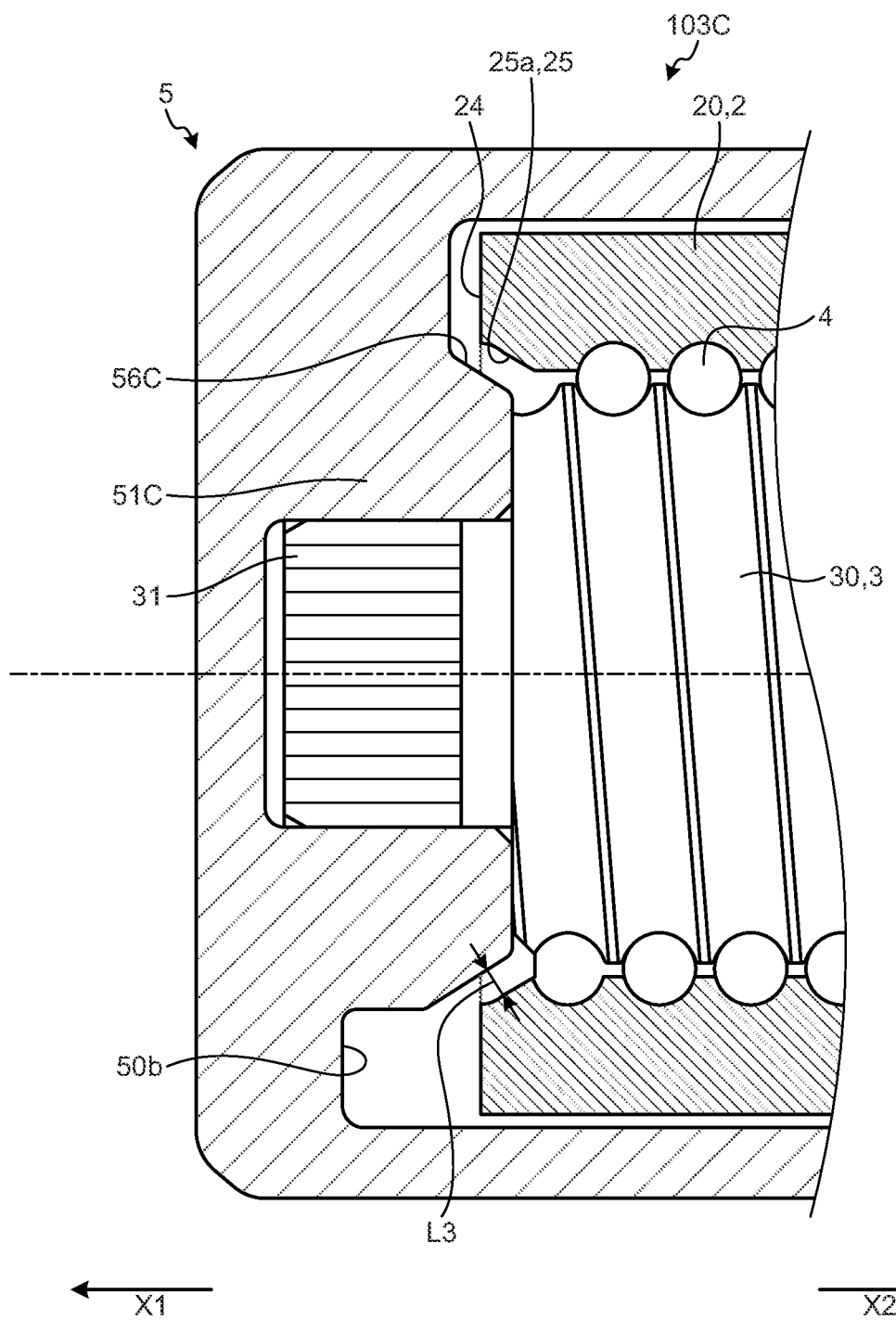
FIG. 8 is an enlarged view of a cylindrical portion and a vicinity thereof in a linear actuator according to a third modification example.

FIG. 8 is an enlarged view of a cylindrical portion and a vicinity thereof in a linear actuator according to the third modification example. As illustrated in FIG. 8, in a linear actuator 103C of the third modification example, an outer peripheral surface 56C of a cylindrical portion 51C is different from that of the first embodiment in a point that a cross section cut in an axial direction is a slope. That is, the outer peripheral surface 56C is a tapered slope having a diameter increasing in a first direction X1. Thus, the outer peripheral surface 56C corresponds to a tapered shape of an edge 25a of a first opening portion 25. As described above, according to the linear actuator 103C of the third modification example, a gap amount L3 between the outer peripheral surface 56C and the edge 25a is smaller than the gap amount L1 of the first embodiment. Thus, grease 200 hardly flows out from the inside of a nut 2 to the outside. In addition, in a case where a piston 5 is manufactured by forging, mold release can be easily performed since the outer peripheral surface 56C is the slope.

Fourth Modification Example

Figure 9:
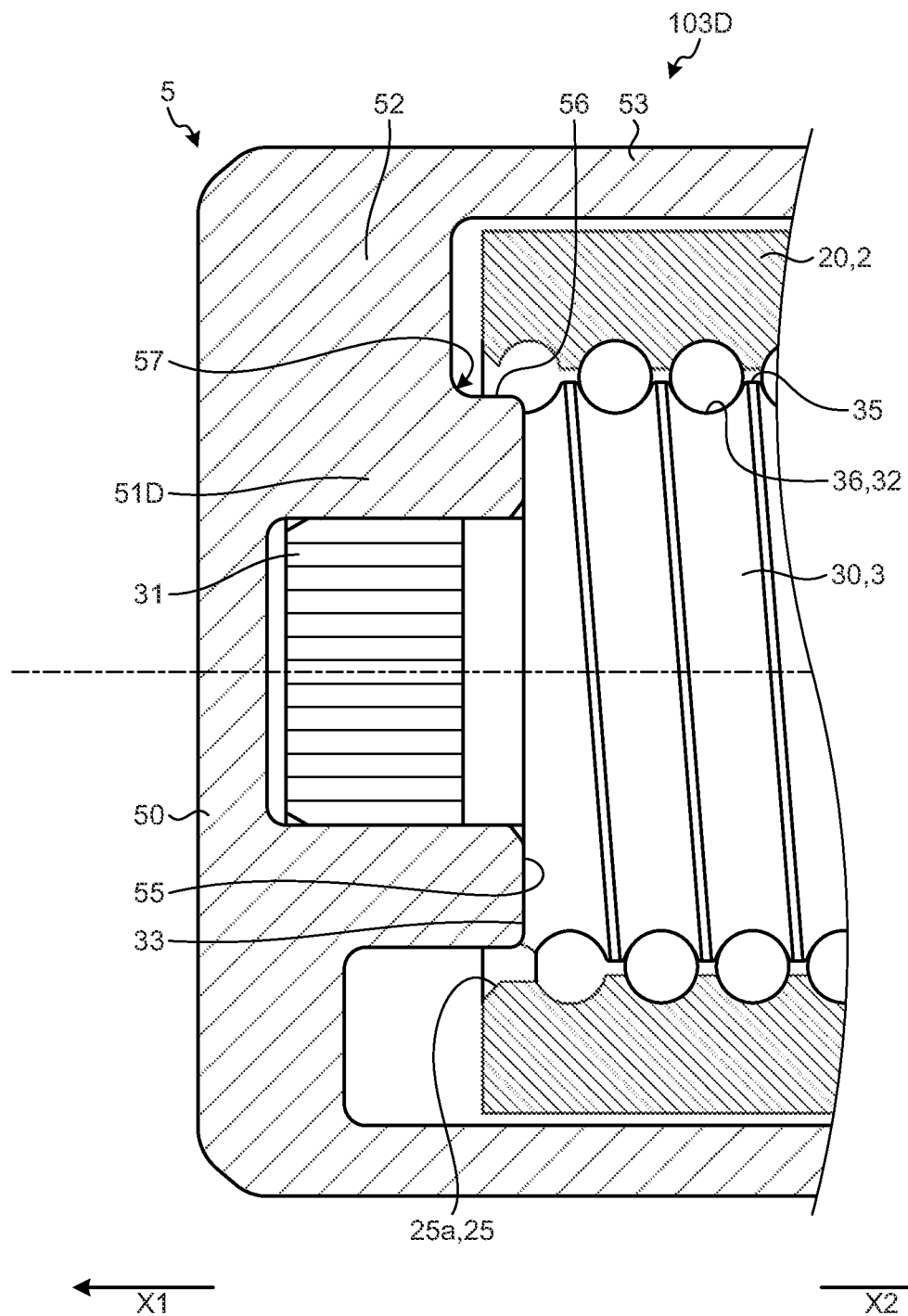
FIG. 9 is an enlarged view of a cylindrical portion and a vicinity thereof in a linear actuator according to a fourth modification example.

FIG. 9 is an enlarged view of a cylindrical portion and a vicinity thereof in a linear actuator according to the fourth modification example. As illustrated in FIG. 9, a linear actuator 103D of the fourth modification example is different from that of the first embodiment in a point that an end surface 55 of a cylindrical portion 51D is located in a second direction X2 compared to an edge 25a of a first opening portion 25. That is, the cylindrical portion 51D of the fourth modification example has a larger protrusion amount in the second direction X2 than the cylindrical portion 51 of the first embodiment. According to the fourth modification example as described above, a movement distance of grease 200, which is adhered to the cylindrical portion 51D, in the second direction X2 increases. That is, the grease 200 can be moved to a back of the nut 2. Thus, the grease 200 is less likely to move to the first opening portion 25 of the nut 2, and an outflow to the outside of the nut 2 is controlled. Although the fourth modification example has been described above, a protruding amount of a cylindrical portion in the present disclosure is not specifically limited.

Note that the present disclosure may be a combination of the following configurations.

(1) A linear actuator including: a ball screw device including a nut, a screw shaft, and a plurality of balls; a piston attached to one end portion of the screw shaft; and a rotation stopper that sets an initial position of the screw shaft in a first direction indicated by the one end portion, in which the screw shaft includes a screw shaft body provided with an outer peripheral raceway surface, a male spline portion that protrudes in the first direction from an end portion in the first direction of the screw shaft body and that has a smaller diameter than the screw shaft body, and a step surface that is provided at a boundary between the screw shaft body and the male spline portion and that faces the first direction, the nut includes an annular first end surface facing the first direction, a first opening portion which is located in an inner periphery of the first end surface and into which the screw shaft is inserted, and a first stopper protruding from the first end surface in the first direction, the piston includes a piston body having a pressing surface facing the first direction and an opposite surface facing a second direction opposite to the first direction, a cylindrical portion that has a cylindrical shape, protrudes from a central portion of the opposite surface in the second direction, and is fitted into the male spline portion, and a second stopper that protrudes from the opposite surface in the second direction and is continuous with an outer peripheral surface of the cylindrical portion, the first stopper and the second stopper abut on each other and form the rotation stopper in a case where the screw shaft is at the initial position, the step surface is arranged in the second direction compared to the first opening portion and is located inside the nut in a case where the screw shaft is at the initial position, the cylindrical portion protrudes in the second direction compared to the second stopper and abuts on the step surface, and an outer peripheral surface of the cylindrical portion has a larger diameter than a groove bottom of the outer peripheral raceway surface.

(2) The linear actuator according to (1), in which the outer peripheral surface of the cylindrical portion has the diameter larger than an outer diameter of a screw thread of the screw shaft body.

(3) The linear actuator according to (1), in which the outer peripheral surface of the cylindrical portion has the diameter smaller than an outer diameter of a screw thread of the screw shaft body.

(4) The linear actuator according to any one of (1) to (3), further including a housing that houses the ball screw device, the piston, and the rotation stopper, in which the piston includes a cylindrical outer cylinder that protrudes from the opposite surface in the second direction and surrounds an outer peripheral side of the nut, and an outer peripheral surface of the outer cylinder forms a sliding surface slidably supported with respect to the housing.

(5) The linear actuator according to (4), in which a gap amount between an inner peripheral surface of the outer cylinder and an outer peripheral surface of the nut is smaller than a gap amount between the cylindrical portion and the first opening portion.

(6) The linear actuator according to (4) or (5), in which an inner peripheral surface of the outer cylinder is continuous with the second stopper.

(7) The linear actuator according to any one of (1) to (6), in which an edge of the first opening portion has a tapered shape a diameter of which increases toward the first direction, and the outer peripheral surface of the cylindrical portion is provided with a tapered slope which faces the edge of the first opening portion and a diameter of which increases toward the first direction.

REFERENCE SIGNS LIST

1 BALL SCREW DEVICE
2 NUT
3 SCREW SHAFT
4 BALL
5 PISTON
6 ROTATION STOPPER
10 COUPLING PORTION
20 NUT BODY
22 INNER PERIPHERAL RACEWAY SURFACE
23 S GROOVE
24 FIRST END SURFACE
25 FIRST OPENING PORTION
25a EDGE
26 FIRST STOPPER
26a FIRST CONTACT SURFACE
30 SCREW SHAFT BODY
31 MALE SPLINE PORTION
32 OUTER PERIPHERAL RACEWAY SURFACE
33 STEP SURFACE
35 SCREW THREAD
36 GROOVE BOTTOM
50 PISTON BODY
50a PRESSING SURFACE
50b OPPOSITE SURFACE
51, 51A, 51B, 51C, 51D CYLINDRICAL PORTION
52 SECOND STOPPER
52a SECOND CONTACT SURFACE
53 OUTER CYLINDER
55 END SURFACE
56, 56A, 56B, 56C OUTER PERIPHERAL SURFACE
100 BRAKE BOOSTER
103, 103A, 103B, 103C, 103D LINEAR ACTUATOR
120 HOUSING

The invention claimed is:

1. A linear actuator comprising:
a ball screw device including a nut, a screw shaft, and a plurality of balls;
a piston attached to one end portion of the screw shaft; and
a rotation stopper that sets an initial position of the screw shaft in a first direction indicated by the one end portion, wherein
the screw shaft includes
a screw shaft body provided with an outer peripheral raceway surface,
a male spline portion that protrudes in the first direction from an end portion in the first direction of the screw shaft body and that has a smaller diameter than the screw shaft body, and
a step surface that is provided at a boundary between the screw shaft body and the male spline portion and that faces the first direction,
the nut includes
an annular first end surface facing the first direction,
a first opening portion which is located in an inner periphery of the first end surface and into which the screw shaft is inserted, and
a first stopper protruding from the first end surface in the first direction,
the piston includes
a piston body having a pressing surface facing the first direction and an opposite surface facing a second direction opposite to the first direction,
a cylindrical portion that has a cylindrical shape, protrudes from a central portion of the opposite surface in the second direction, and is fitted into the male spline portion, and
a second stopper that protrudes from the opposite surface in the second direction and is continuous with an outer peripheral surface of the cylindrical portion,
the first stopper and the second stopper abut on each other and form the rotation stopper in a case where the screw shaft is at the initial position,
the step surface is arranged in the second direction compared to the first opening portion and is located inside the nut in a case where the screw shaft is at the initial position,
the cylindrical portion protrudes in the second direction compared to the second stopper and abuts on the step surface, and
an outer peripheral surface of the cylindrical portion has a larger diameter than a groove bottom of the outer peripheral raceway surface.

2. The linear actuator according to claim 1, wherein the outer peripheral surface of the cylindrical portion has the diameter larger than an outer diameter of a screw thread of the screw shaft body.

3. The linear actuator according to claim 1, wherein
the outer peripheral surface of the cylindrical portion has the diameter smaller than an outer diameter of a screw thread of the screw shaft body.

4. The linear actuator according to claim 1, further comprising
a housing that houses the ball screw device, the piston, and the rotation stopper, wherein
the piston includes a cylindrical outer cylinder that protrudes from the opposite surface in the second direction and surrounds an outer peripheral side of the nut, and
an outer peripheral surface of the outer cylinder forms a sliding surface slidably supported with respect to the housing.

5. The linear actuator according to claim 4, wherein
a gap amount between an inner peripheral surface of the outer cylinder and an outer peripheral surface of the nut is smaller than a gap amount between the cylindrical portion and the first opening portion.

6. The linear actuator according to claim 4, wherein
an inner peripheral surface of the outer cylinder is continuous with the second stopper.

7. The linear actuator according to claim 1, wherein
an edge of the first opening portion has a tapered shape a diameter of which increases toward the first direction, and
the outer peripheral surface of the cylindrical portion is provided with a tapered slope which faces the edge of the first opening portion and a diameter of which increases toward the first direction.

* * * * *